United States Patent
Minamibori et al.

(10) Patent No.: US 9,029,010 B2
(45) Date of Patent: May 12, 2015

(54) MOLDING PACKAGING MATERIAL AND MOLDED CASE

(71) Applicant: Showa Denko Packaging Co., Ltd., Isehara-shi, Kanagawa (JP)

(72) Inventors: Yuuji Minamibori, Isehara (JP); Koji Minamitani, Isehara (JP); Tetsunobu Kuramoto, Isehara (JP)

(73) Assignee: Showa Denko Packaging Co., Ltd., Kanagawa (JP)

( * ) Notice: Subject to any disclaimer, the term of this patent is extended or adjusted under 35 U.S.C. 154(b) by 0 days.

(21) Appl. No.: 13/833,610

(22) Filed: Mar. 15, 2013

(65) Prior Publication Data
US 2013/0244088 A1 Sep. 19, 2013

(30) Foreign Application Priority Data
Mar. 19, 2012 (JP) .................... 2012-61726

(51) Int. Cl.
*H01M 2/02* (2006.01)
*B32B 15/08* (2006.01)
*B32B 15/085* (2006.01)
*B32B 15/088* (2006.01)

(52) U.S. Cl.
CPC ............. *H01M 2/0287* (2013.01); *B32B 15/08* (2013.01); *B32B 15/085* (2013.01); *B32B 15/088* (2013.01); *B32B 2255/06* (2013.01); *B32B 2255/28* (2013.01); *B32B 2307/306* (2013.01); *B32B 2307/4023* (2013.01); *B32B 2307/714* (2013.01); *B32B 2307/75* (2013.01); *B32B 2439/70* (2013.01); *B32B 2439/80* (2013.01)

(58) Field of Classification Search
CPC .............................. H01M 2/02; H01M 2/0217
USPC .................... 429/175, 163, 177, 167
See application file for complete search history.

(56) References Cited

U.S. PATENT DOCUMENTS

| 2004/0241541 | A1* | 12/2004 | Watanabe et al. ............. 429/163 |
| 2008/0286635 | A1* | 11/2008 | Seino et al. ..................... 429/94 |
| 2011/0104546 | A1* | 5/2011  | Seino et al. ................... 429/120 |

FOREIGN PATENT DOCUMENTS

| JP | 2009-289533 A | 12/2009 |
| JP | 2011-054563 A | 3/2011 |
| JP | 2011-096552 A | 5/2011 |

* cited by examiner

*Primary Examiner* — Stewart Fraser
*Assistant Examiner* — Olatunji Godo
(74) *Attorney, Agent, or Firm* — Keating & Bennett, LLP

(57) ABSTRACT

The molding packaging material 1 according to the present invention includes a heat resistant resin layer 2 as an outer layer, a thermoplastic resin layer 3 as an inner layer, a metal foil layer 4 arranged between the heat resistant resin layer and the thermoplastic resin layer, and a black ink layer 10 arranged between the metal foil layer 4 and the heat resistant resin layer 2. The black ink layer 10 contains carbon black, diamine, polyol, and hardening agent. The black ink layer does not partially crack and detach even when the molding packaging material according to the present invention is used in a somewhat harsh environment such as a hot and humid environment and/or at the time of molding or sealing.

7 Claims, 1 Drawing Sheet

MOLDING PACKAGING MATERIAL AND MOLDED CASE

TECHNICAL FIELD

The present invention relates to a molding packaging material and a molded case preferably for use as a case for a secondary battery (lithium ion secondary battery) for use in, e.g., laptop computers, mobile phones, automobiles, and stationary devices. The present invention also relates to a molding packaging material and a molded case preferably for use as a packaging material for foods and pharmaceutical products.

TECHNICAL BACKGROUND

There is an increasing demand to color a battery, such as, e.g., a lithium ion secondary battery, to match the appearance and color thereof to those of a device such as an electric device to which the battery is to be mounted. To give a stately feeling and/or a high-grade feeling, such a device is colored black in many cases. In such a case, the battery thereof is also colored black in many cases.

To color a battery black or other colors, there are means for, e.g., coloring a resin layer used as a battery packaging material or providing a print layer under a base material resin layer.

For example, as a battery packaging material having a colored layer, the following packaging materials are known:

1) a packaging material having a structure in which a base material layer, an adhesive agent layer, a metal foil layer, and a thermal adhesive resin layer are laminated in this order, and a pigment is added to any one of the base material layer, the adhesive agent layer, and the metal foil layer (see Patent Document 1: Japanese Unexamined Laid-open Patent Application Publication No. 2011-054563);

2) a battery outer packaging material having a layer containing a black material such as a carbon material, etc. (see Patent Document 2: Japanese Unexamined Laid-open Patent Application Publication No. 2011-096552); and 3) a battery packaging material having a structure in which a white resin film base material is laminated on a surface of a battery outer packaging material and a white ink layer is laminated on a surface of the white resin film base material (see Patent Document 3: Japanese Unexamined Laid-open Patent Application Publication No. 2009-289533).

DISCLOSURE OF THE INVENTION

Problems to be Solved by the Invention

However, in the case of providing a print layer containing carbon black as a pigment on an inner surface of an outer resin layer constituting a battery packaging material to color a battery black, there are the following problems.

That is, when molding the black packaging material into a container (case) shape by deep-drawing or bulging, the print layer containing carbon black partially cracks and gets detached, making the base layer (not black) visible from the outside, which impairs the even black coloring.

Such partial detachment of the print layer also occurs at the time of sealing a black packaging material after sealing electrodes and electrolyte or at the time of using a battery packaged in the black packaging material under a somewhat harsh environment, such as, e.g., a hot and humid environment.

The present invention was made in view of the aforementioned technical background, and aims to provide a molding packaging material capable of preventing a partial crack and/or a detachment of a black ink layer at the time of molding or sealing, and even at the time of being used under a somewhat harsh environment, such as, e.g., a hot and humid environment.

Means to Solve the Problems

To achieve the aforementioned objects, the present invention provides the following means.

[1] A molding packaging material comprising:
a heat resistant resin layer as an outer layer;
a thermoplastic resin layer as an inner layer;
a metal foil layer arranged between the heat resistant resin layer and the thermoplastic resin layer; and
a black ink layer arranged between the metal foil layer and the heat resistant resin layer,
wherein the black ink layer contains carbon black, diamine, polyol, and a hardening agent, and
wherein an amount of the hardening agent contained in the black ink layer per 100 mass parts of a total amount of the carbon black, the diamine and the polyol of the black ink layer is 2 to 20 mass parts.

[2] The molding packaging material as recited in Item 1, wherein, in the black ink layer (solid content after drying),
a content rate of the carbon black is 15 to 60 mass %, and
a total content rate of the diamine, the polyol, and the hardening agent is 40 to 85 mass %.

[3] The molding packaging material as recited in Item 1 or 2,
wherein one or more polyols selected from the group consisting of polyurethane series polyol, polyester series polyol, and polyether series polyol is used as the polyol.

[4] The molding packaging material as recited in any one of Items 1 to 3,
wherein one or more diamines selected from the group consisting of ethylene diamine, dimer diamine, 2-hydroxyethyl ethylene diamine, 2-hydroxyethyl propylene diamine, and dicyclohexylmethane diamine is used as the diamine.

[5] The molding packaging material as recited in any one of Items 1 to 4,
wherein an isocyanate compound is used as the hardening agent.

[6] The molding packaging material as recited in any one of Items 1 to 5, further comprising
a matt coated layer laminated on an outer surface of the heat resistant resin layer.

[7] A molded case obtained by deep-drawing or bulging the molding packaging material as recited in any one of Items 1 to 6.

[8] The molded case as recited in Item 7, wherein the molded case is used as a battery case.

Effect of the Invention

In the invention [1], it is structured such that a black ink layer is provided between a metal foil layer and the heat resistant resin layer, and the black ink layer has a composition containing carbon black, diamine, polyol, and hardening agent, and 2 to 20 mass parts of the hardening agent is contained per 100 mass parts of a total amount of the carbon black, the diamine, and the polyol. Therefore, when the packaging material is molded by deep-drawing or bulging, and/or when the packaging material is sealed, no partial cracking and/or detachment of the black ink layer occurs. Further, even when it is used under a somewhat harsh environment such as a hot and humid environment, no partial cracking and/or detachment of the black ink layer occurs.

In the invention [2], in the black ink layer (solid content after drying), the content rate of the carbon black is 15 to 60 mass %, and the total content rate of the diamine, the polyol, and the hardening agent is 40 to 85 mass %. Therefore, at the time of, e.g., molding, sealing, or using under a somewhat harsh environment, it is possible to sufficiently prevent occurrence of partial cracking and/or detachment of the black ink layer.

In the invention [3], as the polyol, one or more types of polyols selected from the group consisting of polyurethane series polyol, polyester series polyol, and polyether series polyol is used. Therefore, a strong and flexible black ink layer can be formed by urethane bond obtained by the reaction with the hardening agent.

In the invention [4], because a certain diamine is used, there is an advantage that it reacts quickly with the hardening agent to form a urea bond and therefore a black ink layer can be formed quickly.

In the invention Item [5], because an isocyanate compound is used as the hardening agent, the isocyanate compound reacts with the polyol to form a urethane bond, and also reacts with the diamine to form a urea bond. Therefore a highly adhesive black ink layer can be formed on the heat resistant resin layer.

In the invention Item [6], the molding packaging material is further provided with a matt coated layer laminated on the outer surface of the heat resistant resin layer. This gives an excellent slippage to the surface, which in turn can provide a packaging material excellent in molding performance.

In the invention Item [7], even at the time of being used under a somewhat harsh environment such as a hot and humid environment as well as at the time of sealing, a molded case in which no partial cracking and/or detachment of the black ink layer occurs can be provided.

In the invention as recited in Item [8], even at the time of being used under a somewhat harsh environment such as a hot and humid environment as well as at the time of sealing, a battery case in which no partial cracking and/or detachment of the black ink layer occurs can be provided.

PREFERRED EMBODIMENTS FOR CARRYING OUT THE INVENTION

Figure 1:
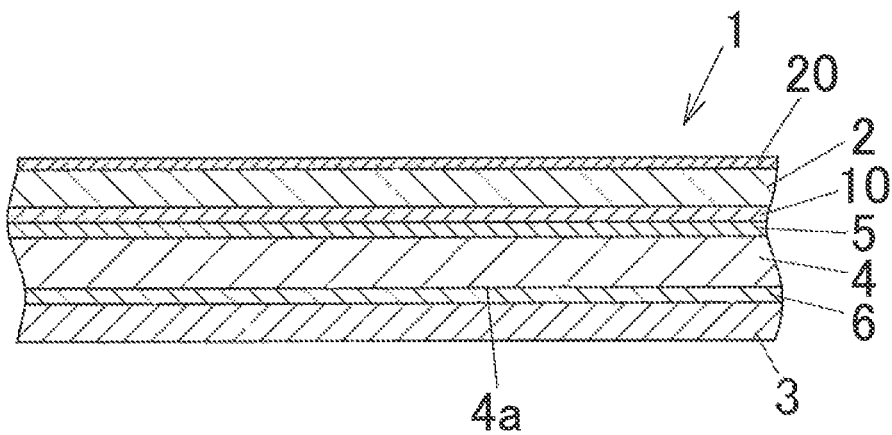
FIG. 1 is a cross-sectional view showing an embodiment of a molding packaging material according to the present invention.

An embodiment of a molding packaging material 1 according to the present invention is shown in FIG. 1. This molding packaging material 1 is used as a packaging material for a lithium-ion secondary battery. In other words, the molding packaging material 1 is subjected to deep-drawing, etc., and used as a secondary battery case.

The molding packaging material 1 is constituted such that a heat resistant resin layer (outer layer) 2 is integrally laminated on an upper surface of a metal foil layer 4 via a first adhesive agent layer 5 and that a thermoplastic resin layer (inner layer) 3 is integrally laminated on a lower surface of the metal foil layer 4 via a second adhesive agent layer 6. A black ink layer 10 is laminated on a lower surface of the heat resistant resin layer 2 (see FIG. 1). That is, the black ink layer 10 is arranged between the metal foil layer 4 and the heat resistant resin layer 2. In this embodiment, the black ink layer 10 is formed on the lower surface of the heat resistant resin layer 2 by printing. Also, a matt coated layer 20 is laminated on the upper surface (outer surface) of the heat resistant resin layer 2.

As the heat resistant resin layer (outer layer) 2, a polyamide film, such as, e.g., a nylon film and a polyester film, although not specifically limited to, can be exemplified. A stretched film thereof can be preferably used. Among other things, as the heat resistant resin layer 2, it is especially preferably to use a biaxially stretched polyamide film such as a biaxially stretched nylon film, a biaxially stretched polybutylene terephthalate (PBT) film, a biaxially stretched polyethylene terephthalate (PET) film, or a biaxially stretched polyethylene naphthalate (PEN) film. As the nylon film, a 6-nylon film, a 6,6 nylon film, and a MXD nylon film, although not specifically limited to, can be exemplified. The heat resistant resin layer 2 can be formed by a single layer, or can be formed by a multi-layer constituted by, for example, a polyester film/a polyamide film (e.g., a multi-layer made by a PET film/a nylon film).

A thickness of the heat resistant resin layer 2 is preferably set to 12 to 50 μm. In the case of using a polyester film, the thickness is preferably set to 12 to 50 μm. In the case of using a nylon film, the thickness is preferably set to 15 to 50 μm. By setting the thickness to the preferred lower limit or higher, a sufficient strength for a packaging material can be secured. By setting the thickness to the preferred upper limit or lower, the stress at the time of bulging or deep-drawing can be reduced, enabling an improved moldability.

The thermoplastic resin layer (inner layer) 3 undertakes a role of giving an excellent chemical resistance against, for example, electrolytes strong in corrosiveness used for, e.g., a lithium-ion secondary battery and also undertakes a role of giving a heat-sealing characteristic to the packaging material.

As the thermoplastic resin layer 3, it is preferably to use, although not specifically limited to, a thermoplastic resin unstretched film layer. The thermoplastic resin unstretched film layer 3 is preferably constituted by, although not specifically limited to, an unstretched film made of at least one type of thermoplastic resins selected from the group consisting of polyethylene, polypropylene, olefin series copolymer, acid denaturation thereof and ionomer.

The thickness of the thermoplastic resin layer 3 is preferably set to 20 to 80 μm. Setting the thickness to 20 μm or more sufficiently prevents generation of pinholes. Setting the thickness to 80 μm or less reduces the amount of resin to be used, enabling cost reduction. Above all, it is especially preferable that the thickness of the thermoplastic resin layer 3 is set to 30 to 50 μm. The aforementioned thermoplastic resin layer 3 can be a single layer or a multi-layer.

The metal foil layer 4 undertakes a role of giving a gas barrier performance which prevents invasion of oxygen and/or moisture into the molding packaging material. As the metal foil layer 4, an aluminum foil and a copper foil, although not specifically limited to, can be exemplified. An aluminum foil is generally used. The thickness of the metal foil layer 4 is preferably set to 20 to 100 μm. Setting the thickness to 20 μm or more prevents generation of pinholes during rolling for producing the metal foil. Setting the thickness to 100 μm or less reduces the stress during bulging and deep-drawing, resulting in improved moldability.

It is preferable that at least the inner surface 4a (second adhesive agent layer 6 side surface) of the metal foil layer 4 is subjected to a chemical conversion treatment. Subjecting the metal foil layer to a chemical conversion treatment sufficiently prevents corrosion on the metal foil surface due to contents (such as electrolyte of batteries, foods, pharmaceuticals). For example, the chemical conversion treatment of the metal foil can be performed by the following treatments. For example, chemical conversion treatment can be performed by applying any one of the followings:

1) a water solution made of a mixture of phosphoric acid, chromium acid, and fluoride metallic salt;

2) a water solution made of a mixture of phosphoric acid, chromium acid, and fluoride metallic or non-metallic salt; and 3) a water solution made of a mixture of acrylic series resin and/or phenol series resin, phosphoric acid, chromium acid, and fluoride metallic salt, to the surface of a degreased metal foil, and drying the metal foil.

In the present invention, the black ink layer 10 contains carbon black, diamine, polyol and a hardening agent.

In the black ink layer 10 (ink layer after drying), it is preferable that the content rate of the carbon black is 15 to 60 mass % and the total content rate of the diamine, the polyol, and the hardening agent is 40 to 85 mass %. It is more preferable that the content rate of the carbon black is 20 to 50 mass %.

If the content rate of the carbon black is less than 15 mass %, the metallic shine of the metal foil layer 4 remains, deteriorating the stately feeling of the packaging material. Further, the content rate causes partial color variability during the molding processing. On the other hand, if the content rate of the carbon black exceeds 60 mass %, the black ink layer 10 becomes hard and brittle. This results in a deteriorated adhesive force to the metal foil layer 4, causing detachment between the metal foil layer 4 and the black ink layer 10 during the molding processing.

It is preferable that the black ink layer 10 contains 2 to 20 mass parts of the hardening agent per 100 mass parts of the total amount of the carbon black, the diamine, and the polyol. If the content of the hardening agent is less than 2 mass parts, detachment between the metal foil layer 4 and the black ink layer 10 likely occurs during the molding processing. If the content of the hardening agent exceeds 20 mass parts, blocking occurs when letting out (unrolling) the packaging material 1 in a rolled state, causing inconveniences such as transferring and/or adhesion on the outer surface of the heat resistant resin layer 2 and/or the thermoplastic resin layer 3.

It is preferable that the thickness of the black ink layer 10 is 1 to 4 μm. By setting the thickness to 1 μm or more, no transparency remains in the color tone of the black ink layer 10, and the color and shine of the metal foil layer 4 can be sufficiently concealed. By setting the thickness to 4 μm or less, the black ink layer 10 can be sufficiently prevented from partially cracking during the molding processing.

As the method of forming the black ink layer 10, for example, a gravure printing method, a reverse roll coating method, and a lip roll coating method, although not specifically limited to, can be exemplified.

The black ink layer 10 can be formed by, although not specifically limited to, printing (applying) an ink composition containing carbon black, diamine, polyol, a hardening agent, and an organic solvent on the lower surface (rear surface) of the heat resistant resin layer 2 with a gravure printing method. As the organic solvent, toluene, although not specifically limited to, can be exemplified As the carbon black, it is preferable to use a carbon black having an average particle diameter of 10 to 500 μm.

As the diamine, the examples include, although not specifically limited to, ethylene diamine, dimer diamine, 2-hydroxyethyl ethylene diamine, 2-hydroxyethyl propylene diamine, dicyclohexyl methane diamine, and 2-hyeroxyehtyl propylene diamine. It is especially preferable to use one or more types of diamines selected from the group consisting of ethylene diamine, dimer diamine, 2-hydroxyethyl ethylene diamine, 2-hydroxyethy propylene diamine, and dicyclohexyl methane diamine, as the diamine.

The diamine has a faster rate of reaction with the hardening agent (isocyanate, etc.) as compared with polyol, enabling quick hardening. That is, the aforementioned diamine reacts with the hardening agent along with polyol to enhance cross-linking hardening of ink compositions.

As the polyol, it is preferable to use, although not specifically limited to, one or more types of polyols selected from the group consisting of polyurethane series polyol, polyester series polyol, and polyether series polyol.

It is preferable that the number average molecular weight of the aforementioned polyol falls within the range of 1,000 to 8,000. By setting it to 1,000 or more, the adhesive strength after hardening can be increased. By setting it to 8,000 or less, the rate of reaction with the hardening agent can be increased.

As the hardening agent, although not specifically limited to, isocyanate compounds can be exemplified. As the isocyanate compound, a variety of isocyanate compounds including, e.g., an aromatic series isocyanate compound, an aliphatic series isocyanate compound, and an alicyclic series isocyanate compound, can be used. As specific examples, for example, tolylene diisocyanate (TDI), diphenyl-methane diisocyanate, hexamethylene diisocyanate (HDI), and isophorone diisocyanate can be exemplified.

As the first adhesive agent layer 5, although not specifically limited to, an adhesive agent layer formed by, e.g., a two-fluid reaction type adhesive agent can be exemplified. As the two-fluid reaction type adhesive agent, a two-fluid reaction type adhesive agent constituted by a first solution made of one or more types of polyols selected from the group consisting of polyurethane series polyol, polyester series polyol, and polyether polyol, and a second solution (hardening agent) made of isocyanate can be exemplified. The first adhesive agent layer 5 is formed by, e.g., a gravure coating method by applying an adhesive agent such as the aforementioned two-fluid reaction type adhesive agent to the upper surface of the metal foil layer 4 and/or the lower surface of the heat resistant resin layer 2 (e.g., the lower surface of the black ink layer 10).

As the second adhesive agent layer 6, although not specifically limited to, an adhesive agent layer made of, for example, polyurethane series adhesive agent, acrylic series adhesive agent, epoxy series adhesive agent, polyolefin series adhesive agent, elastomer series adhesive agent, and fluorine series adhesive agent can be exemplified. It is more preferable to use an acrylic series adhesive agent or an polyolefin series adhesive agent. In this case, the anti-electrolyte resistance and vapor barrier performance of the packaging material can be improved.

The matt coated layer 20 is a matt coated layer having a resin composition in which inorganic fine particles are contained in a heat resistant resin component in a dispersed state. It is more preferable that the matt coated layer 20 is constituted by a resin composition in which 0.1 mass % to 1 mass % of inorganic fine particles having an average particle diameter of 1 to 10 μm are contained in a two-fluid hardening type heat resistant resin. As the heat resistant resin, for example, acrylic series rein, epoxy series resin, urethane series resin, polyolefin series resin, and fluoride series resin can be exemplified. However, in view of the excellent heat resistant and chemical resistant characteristics, fluoride series rein based on tetrafluoro ethylene or fluoro ethylene vinyl ether is preferably used. As the inorganic fine particles, although not specifically limited to, for example, silica, alumina, calcium oxide, calcium carbonate, calcium sulphate, and calcium silicate can be exemplified. Among them, silica is especially preferred. Providing such a matt coated layer 20 gives an excellent slippage on the surface of a packaging material 1, resulting in a packaging material 1 excellent in moldability. The gloss value of the surface of the matt coated layer 20 is preferably set to 1 to 15%. The gloss value is a value measured by a gloss measuring apparatus "micro-TRI-gloss-s" manufactured by BYK Cooperation with a reflection angle of 60°.

In the aforementioned embodiment, it is configured such that the first adhesive agent layer 5 and the second adhesive agent layer 6 are provided. However, these two layers 5 and 6 do not constitute essential structural layers. It can be configured not to provide these layers.

Figure 2:
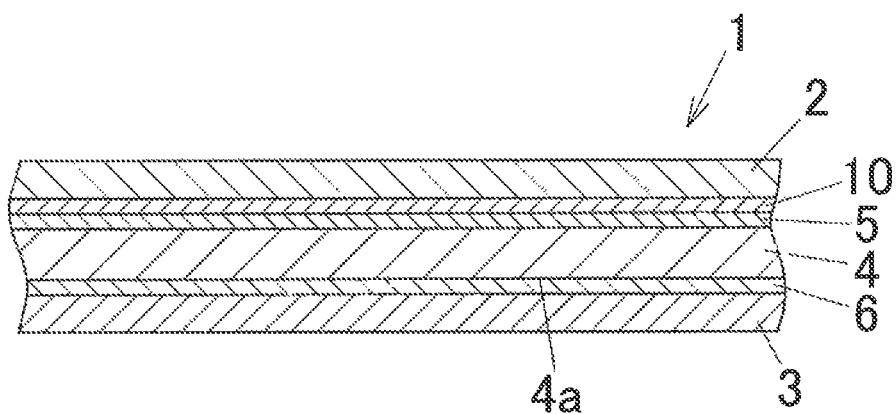
FIG. 2 is a cross-sectional view showing another embodiment of a molding packaging material according to the present invention.

Also, in the aforementioned embodiment, it is configured such that the matt coated layer 20 is laminated on the upper surface of the heat resistant resin layer 2. However, this matt coated layer 20 does not constitute an essential structural layer. For example, as shown in FIG. 2, it can be configured not to provide the matt coated layer 20.

By molding (deep-drawing, bulging, etc.) the molding packaging material 1 of the present invention, a molded case (e.g., battery case) can be obtained.

EXAMPLES

Next, specific Examples of the present invention will be explained. It should be, however, noted that the present invention is not specifically limited to these Examples.

Example 1

A base compound was obtained by blending 50 mass parts of carbon black having an average particle diameter of 150 µm, 5 mass parts of ethylene diamine, and 45 mass parts of polyester series polyol (number average molecular weight: 2,500). To 100 mass parts of the base compound, 3 mass parts of tolylene diisocyanate (TDI) as a hardening agent and 50 mass parts of toluene were blended and stirred well to obtain an ink composition.

The ink composition was printed (applied) on one of the surfaces of a biaxially stretched nylon film (heat resistant resin layer) 2 having a thickness of 15 µm by a gravure printing method. Thereafter, it was left for one day in a 40° C. environment to dry and develop the cross-linking reaction to thereby form a black ink layer 10 having a thickness of 3 µm.

On the other hand, a chemical conversion treatment solution containing polyacrylic acid, trivalent chromium compound, water, and alcohol was applied to both surfaces of an aluminum foil 4 having a thickness of 35 µm, and it was dried at 180° C. so that the coating amount of chromium became 10 $mg/m^2$.

Next, the biaxially stretched nylon film 2 was pasted on one of the surfaces of the chemical conversion treated aluminum foil 4 via a polyester series polyurethane adhesive agent layer 5 with the black ink layer 10 side of the biaxially stretched nylon film 2 facing the aluminum foil 4. Then, an unstretched polypropylene film (thermoplastic resin layer) 3 having a thickness of 30 µm was pasted on the other surface of the aluminum foil 4 via a polyacrylic adhesive agent layer 6, and it was left for 5 days under a 40° C. environment to thereby obtain a laminated member.

Furthermore, a coating composition containing 80 mass parts of fluoro ethylene vinylester, 10 mass parts of barium sulphate, and 10 mass parts of powder silica was applied on the biaxially stretched nylon film 2 of the laminated body (on the unlaminated surface) to form a matt coated layer 20 having a thickness of 2 µm. Thus, a molding packaging material 1 as shown in FIG. 1 was obtained.

Example 2

A molding packaging material 1 as shown in FIG. 1 was obtained in the same manner as in Example 1 except that 10 mass parts of tolylene diisocyanate was blended in place of 3 mass parts of tolylene diisocyanate.

Example 3

A molding packaging material 1 as shown in FIG. 1 was obtained in the same manner as in Example 1 except that 15 mass parts of tolylene diisocyanate was blended in place of 3 mass parts of tolylene diisocyanate.

Example 4

A molding packaging material 1 as shown in FIG. 1 was obtained in the same manner as in Example 1 except that 20 mass parts of tolylene diisocyanate was blended in place of 3 mass parts of tolylene diisocyanate.

Example 5

A molding packaging material 1 as shown in FIG. 1 was obtained in the same manner as in Example 2 except that 45 mass parts of polyurethane series polyol (number average molecular weight: 3,000) was blended in place of 45 mass parts of polyester series polyol.

Example 6

A molding packaging material 1 as shown in FIG. 1 was obtained in the same manner as in Example 2 except that 45 mass parts of polyurethane series polyol (number average molecular weight: 2500) was blended in place of 45 mass parts of polyester series polyol.

Examples 7 and 8

A molding packaging material 1 as shown in FIG. 1 was obtained in the same manner as in Example 2 except that the composition of the ink composition was set to the composition shown in Table 1.

Example 9

A molding packaging material 1 as shown in FIG. 1 was obtained in the same manner as in Example 2 except that 3 mass parts of ethylene diamine and 2 parts of 2-hydroxyethyl ethylene diamine were blended in place of 5 mass parts of ethylene diamine.

Example 10

A molding packaging material 1 as shown in FIG. 1 was obtained in the same manner as in Example 2 except that 5 mass parts of 2-hydroxyethyl ethylene diamine was blended in place of 5 mass parts of ethylene diamine.

Example 11

A molding packaging material 1 as shown in FIG. 1 was obtained in the same manner as in Example 2 except that 10 mass parts of diphenyl-methane diisocyanate (MDI) was blended in place of 10 mass parts of tolylene diisocyanate (TDI).

Comparative Example 1

A molding packaging material was obtained in the same manner as in Example 1 except that 1 part by mass of tolylene diisocyanate was blended in place of 3 mass parts of tolylene diisocyanate.

Comparative Example 2

A molding packaging material was obtained in the same manner as in Example 1 except that 25 mass parts of tolylene diisocyanate was blended in place of 3 mass parts of tolylene diisocyanate.

Comparative Example 3

A molding packaging material was obtained in the same manner as in Example 1 except that the composition of an ink composition was set to the composition shown in Table 2.

Each of the molding packaging materials obtained as described above was evaluated based on the following evaluation method. The results are shown in Tables 1 and 2.

TABLE 1

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Ink Composition (mass parts) | Carbon Black | 50 | 50 | 50 | 50 | 50 | 50 | 35 | 50 |
|  | Ethylene Diamine | 5 | 5 | 5 | 5 | 5 | 5 | 5 | 10 |
|  | 2-hydroxyehtyl ethylene diamine | — | — | — | — | — | — | — | — |
|  | Polyester series Polyol | 45 | 45 | 45 | 45 | — | — | 60 | 40 |
|  | Polyurethane series Polyol | — | — | — | — | 45 | — | — | — |
|  | Polyether series Polyol | — | — | — | — | — | 45 | — | — |
|  | TDI (tolylene diisocyanate) | 3 | 10 | 15 | 20 | 10 | 10 | 10 | 10 |
|  | MDI (diphenyl-methane isocyanate) | — | — | — | — | — | — | — | — |
|  | Toulene (Organic Solvent) | 50 | 50 | 50 | 50 | 50 | 50 | 50 | 50 |
| Evaluation of Occurrence of Detachment on Packaging material | Immediately after Deep-drawing | ◯ | ◎ | ◎ | ◯ | ◎ | ◎ | ◎ | ◎ |
|  | After hot and humid testing | ◯ | ◎ | ◎ | ◯ | ◎ | ◎ | ◎ | ◎ |

TABLE 2

|  |  | Ex. 9 | Ex. 10 | Ex. 11 | Comp. Ex. 1 | Comp. Ex. 2 | Comp. Ex. 3 |
|---|---|---|---|---|---|---|---|
| Ink Composition (mass parts) | Carbon Black | 50 | 50 | 50 | 50 | 50 | 50 |
|  | Ethylene Diamine | 3 | — | 5 | 5 | 5 | — |
|  | 2-hydroxyehtyl ethylene diamine | 2 | 5 | — | — | — | — |
|  | Polyester series Polyol | 45 | 45 | 45 | 45 | 45 | 50 |
|  | Polyurethane series Polyol | — | — | — | — | — | — |
|  | Polyether series Polyol | — | — | — | — | — | — |
|  | TDI (tolylene diisocyanate) | 10 | 10 | — | 1 | 25 | 10 |
|  | MDI (diphenyl-methane isocyanate) | — | — | 10 | — | — | — |
|  | Toulene (Organic Solvent) | 50 | 50 | 50 | 50 | 50 | 50 |

TABLE 2-continued

|  |  | Ex. 9 | Ex. 10 | Ex. 11 | Comp. Ex. 1 | Comp. Ex. 2 | Comp. Ex. 3 |
|---|---|---|---|---|---|---|---|
| Evaluation of Occurrence of Detachment on Packaging material | Immediately after Deep-drawing | ⊙ | ⊙ | ○ | X | Δ | X |
|  | After hot and humid testing | ⊙ | ⊙ | ○ | X | Δ | X |

<Evaluation Method for Occurrences of Detachment>

30 molding packaging materials were produced for each Example and each Comparative Example. In the following two conditions a) and b), the occurrence of detachment of the black ink layer was observed by the naked eye, and the evaluation was made based on the following evaluation standards.
(Evaluation Standard)
"⊙": 0 out of 30 black ink layers was cracked and detached
"○": 1 or 2 out of 30 black ink layers were cracked and detached
"Δ": 3 or 4 out of 30 black ink layers were cracked and detached
"x": 5 to 30 out of 30 black ink layers were cracked and detached
a) Molding packaging material immediately after deep-drawing (a molded case immediately after molding into a rectangular shape with length 50 mm×width 35 mm×depth 5.5 mm, obtained by deep-drawing a molding packaging material confirmed to have no detachment of the black ink layer, using a punch and a die, etc. with the inner polypropylene layer 3 being in contact with the punch)
b) Molding packaging material after hot and humid testing (a molding packaging material in which a molding packaging material confirmed to have no detachment of the black ink layer was continuously put into a hot and humid testing equipment for 72 hours at 60° C.×95% RH, and 5 days have passed at room temperature after being taken out)

As it is apparent from Tables 1 and 2, in the molding packaging material according to the Examples 1 to 11 of the present invention, the black ink layer did not partially crack and detach even if deep-drawing was performed, and the black ink layer did not partially crack and detach even when used under a somewhat harsh environment such as a hot and humid environment.

On the other hand, in the molding packaging material according to the Comparative Examples 1 and 2 wherein the contained amount of the hardening agent deviated from the prescribed range of the present invention, the black ink layer partially cracked and detached after deep-drawing and being used in a somewhat harsh environment such as a hot and humid environment. Also, in the molding packaging material of Comparative Example 3 not containing diamine, the black ink layer partially cracked and detached after deep-drawing and being used in a somewhat harsh environment such as a hot and humid environment.

The present invention claims priority to Japanese Patent Application No. 2012-61726 filed on Mar. 19, 2012, the entire disclosure of which is incorporated herein by reference in its entirety.

The terms and descriptions used herein are used only for explanatory purposes and the present invention is not limited to them. The present invention allows various design-changes falling within the claimed scope of the present invention unless it deviates from the spirits of the invention.

INDUSTRIAL APPLICABILITY

The molding packaging material of the present invention can be preferably used as a battery case for a lithium-ion polymer secondary battery for laptop computers, mobile phones, vehicles, and stationary devices. The molding packaging material of the present invention can be suitably used as a packaging material for foods and pharmaceuticals, but its use is not specifically limited to them. It is especially suitable for use in a battery case.

DESCRIPTION OF THE REFERENCE NUMERALS

1: molding packaging material
2: heat resistant resin layer (outer layer)
3: thermoplastic resin layer (inner layer)
4: metal foil layer
10: black ink layer
20: matt coated layer

The invention claimed is:
1. A molded case comprising:
a molding packaging material including:
   a heat resistant resin layer as an outer layer;
   a thermoplastic resin layer as an inner layer;
   a metal foil layer arranged between the heat resistant resin layer and the thermoplastic resin layer; and
   a black ink layer arranged between the metal foil layer and the heat resistant resin layer,
wherein the black ink layer contains carbon black, diamine, polyol, and a hardening agent,
wherein an amount of the hardening agent contained in the black ink layer per 100 mass parts of a total amount of the carbon black, the diamine and the polyol of the black ink layer is 2 to 20 mass parts,
wherein, in the black layer, a content rate of the carbon black is 15 mass % to 50 mass %, and a total content rate of the diamine, the polyol, and the hardening agent is 40 mass % to 85 mass %, and
wherein the molded case is used as a battery case.
2. The molding packaging material as recited in claim 1, wherein one or more polyols selected from the group consisting of polyurethane series polyol, polyester series polyol, and polyether series polyol is used as the polyol.
3. The molding packaging material as recited in claim 1, wherein one or more diamines selected from the group consisting of ethylene diamine, dimer diamine, 2-hydroxyethyl ethylene diamine, 2-hydroxyethyl propylene diamine, and dicyclohexylmethane diamine is used as the diamine.
4. The molding packaging material as recited in claim 1, wherein an isocyanate compound is used as the hardening agent.
5. The molding packaging material as recited in claim 1, further comprising
a matt coated layer laminated on an outer surface of the heat resistant resin layer.
6. A molded case obtained by deep-drawing or bulging the molding packaging material as recited in claim 1.

7. The molding packaging material as recited in claim 1, wherein the carbon black has an average particle diameter of 10 μm to 500 μm.

* * * * *